United States Patent [19]

Oishi

[11] Patent Number: 5,087,998

[45] Date of Patent: Feb. 11, 1992

[54] MAGNETIC TAPE CASSETTE HAVING IMPROVED ERASURE PREVENTING DEVICE

[76] Inventor: Kengo Oishi, c/o Fuji Photo Film Co., Ltd., No. 12-1, Ogi-cho 2-chome, Odawara-shi, Kanagawa, Japan

[21] Appl. No.: 291,829

[22] Filed: Dec. 29, 1988

[30] Foreign Application Priority Data

Jan. 14, 1988 [JP] Japan .................................. 63-2662[U]

[51] Int. Cl.⁵ .......................................... G11B 23/02
[52] U.S. Cl. ...................................... 360/132; 360/60
[58] Field of Search ............................. 360/132, 60; 242/197–201

[56] References Cited

U.S. PATENT DOCUMENTS 4,791,504 12/1988 Igarashi ............................. 360/60 X
4,811,150 3/1989 Sciggs ................................. 360/132

Primary Examiner—A. J. Heinz

[57] ABSTRACT

A magnetic tape cassette of the $\beta$ cam or $\beta$ cam SP type having an improved mistake erasing preventing construction and improved dustproofing property. For the $\beta$ cam SP type cassette, a movable plug is provided in an insertion hole formed in the bottom face of the cassette housing and a snap-off tab is removed beforehand, while for the $\beta$ cam type cassette, an immovable plug is provided in the insertion hole and the snap-off tab is left intact.

5 Claims, 3 Drawing Sheets

MAGNETIC TAPE CASSETTE HAVING IMPROVED ERASURE PREVENTING DEVICE

BACKGROUND OF THE INVENTION

The present invention relates to a magnetic tape cassette, and more particularly to an improved magnetic tape cassette for video use.

Conventionally, various types of video magnetic tape cassettes have been employed. Recently, video tape cassettes of higher performance with respect to a picture quality, etc., have been desired. Also, in view of current diverse needs, the numbers of the available types kinds of video cassettes has shown a tendency to increase.

In view of such circumstances, a tape cassette commonly referred to as a "β cam cassette" and a video tape cassette commonly referred to as a "β cam SP cassette" have been marketed. The two cassettes are quite similar to each other, differing only in the material of the magnetic tape, the construction of a detection hole formed in the bottom face of the cassette for identifying the type of cassette, and a construction for preventing mistake erasure. Otherwise, the casings of the two cassettes are totally the same.

The mold used for molding the cassette casings is relatively complicated and costly, and therefore it has been common practice to manufacture the two cassette casings using the same mold since it is not desirable, from the viewpoints of productivity and cost, to use two different molds when there are only very minor differences between the two types of cassettes.

However, cassettes manufactured using the same mold have suffered from deficiencies due to the difference in the mistake erasure prevention construction. This difference will be described.

In the mistake erasure prevention construction of the β cam cassette, as shown in FIG. 4, a snap-off tab 30 is provided on the bottom face 11 of the cassette at a position close to the front in the vicinity of one side face 12 of the cassette. As is well known, with this construction, if the tab 30 remains extant, rerecording can freely be carried out repeatedly, while if the tab 30 is snapped off, rerecording cannot be effected. After the tab 30 is snapped off, there remains a concave portion surrounded by walls, which concave portion does not communicate with an inside of the cassette body.

On the other hand, the mistake erasure prevention construction of the β cam SP cassette is provided at the opposite position with respect to the position of the tab 30 of the β cam cassette with respect to the left-and-right direction of the cassette. Specifically, in the mistake erasure prevention construction of the β cam SP cassette, an upward-and-downward slidable movable plug 40 (sliding in the direction of the thickness of the cassette) is mounted in an insertion hole 14 formed in the bottom face 11 of the cassette, as shown in FIG. 5. Leg portions 5, etc., of the movable plug 40 are resiliently engaged with inner walls of the insertion hole 14, and retainer portions 3 and 4 constituted by part of the leg portions 5 are engaged with a retainer aperture 16 and a distal edge 17 of the inner wall, respectively. When the movable plug is retained so as to lie flush with the bottom face 11 of the cassette, rerecording is enabled. Also, by manipulating a thumbpiece 41, exposed through a notch 15, downward in FIG. 5 (in the direction of an arrow B) such as with a finger movement, the retainer portion 3 can be retained by an engaging portion (not shown) in such a manner that the insertion hole 14 defines a recess so as to disable rerecording. The insertion hole 14 is communicated with the inside of the cassette body in order to permit the movable plug 40 to move upwardly and downwardly.

When cassette casings are manufactured using a mold which is capable of accommodating both types of mistake erasure prevention constructions separately at left and right sides of the casing described above, in the case that the cassette casing is employed as a β cam SP cassette, no problem is encountered by arranging the mold in such a manner that the tab 30 shown in FIG. 4 is removed beforehand while the movable plug 40 is mounted in the insertion hole 14 as shown in FIG. 5. However, in the case of the β cam cassette, when it is shipped with the movable plug 40 of FIG. 5 attached for acting as a dustproof device while remaining the tab 30, which plug performs no actual function as a mistake erasure preventing device, there has been encountered the disadvantage that the user sometimes mistakenly attempts to operate the movable plug 40 to control rerecording although he should snap the tab 30 off, since the cassette is shipped with the movable plug 40 which can readily be operated. Thus, the user may not attain the correct operation for the erasure preventing. On the other hand, if the movable plug 40 is removed in order to avoid the above-described problem that the user mistakenly operates the movable plug 40 as he thinks that it acts as an erasure preventing device, there has arisen the problem that dust or other foreign matter may enter the cassette since the insertion hole 14 is in communication with the interior of the cassette.

SUMMARY OF THE INVENTION

The present invention has been made in view of the above problems, and a specific object of the invention is to provide a magnetic tape cassette which is highly dustproof and excellent in operability with no erroneous operation.

This and other objects of the present invention have been achieved by a magnetic tape cassette in which a pair of tape reels on which a magnetic tape is wound are rotatably housed, and in which a movable or a flattened immovable plug is beforehand inserted into an insertion hole for a mistake erasure prevention plug, which hole is formed in a bottom face of a cassette casing, together with a snap-off tab.

DESCRIPTION OF THE PREFERRED EMBODIMENTS

Figure 1:
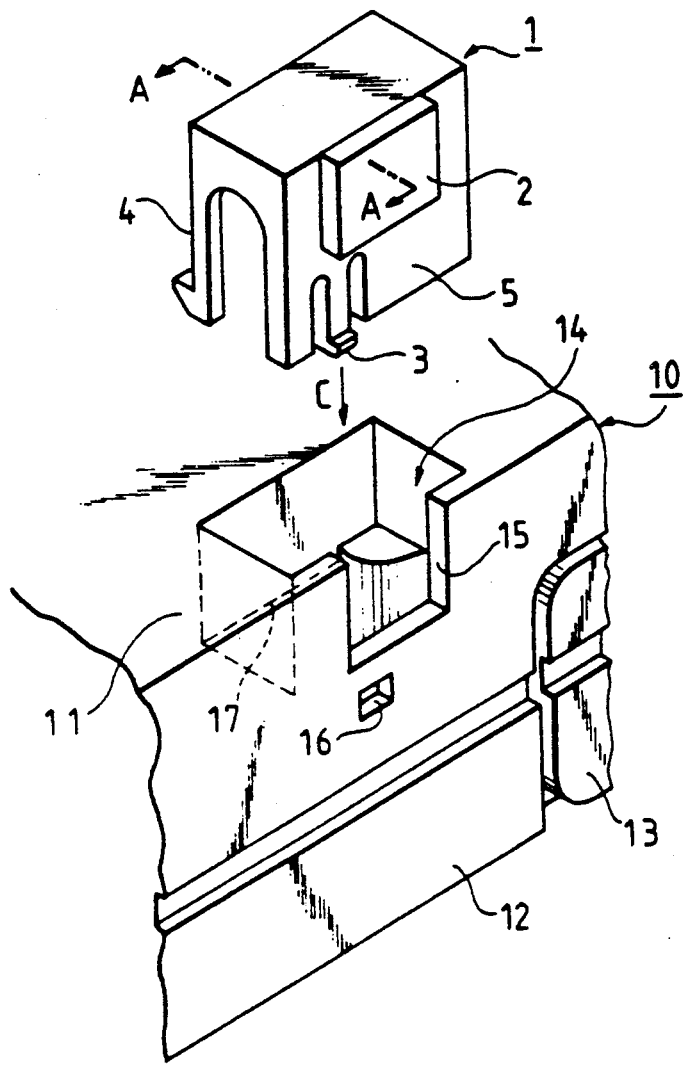
FIG. 1 is an exploded perspective view of an important portion of a preferred embodiment of a tape cassette of the present invention.

Preferred embodiments of the present invention illustrated in the drawings will now be described in detail.

FIG. 1 is an exploded perspective view of an important portion of a first preferred embodiment of a tape cassette of the present invention.

Figure 4:
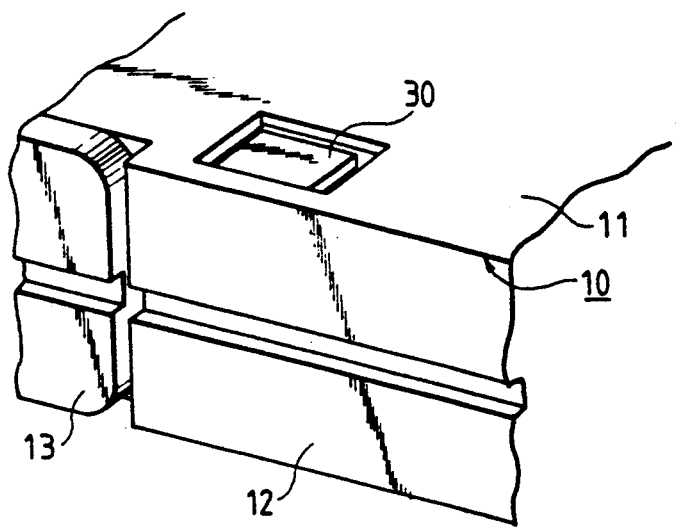
FIGS. 4 and 5 are partial perspective views of conventional video cassettes.
Figure 5:
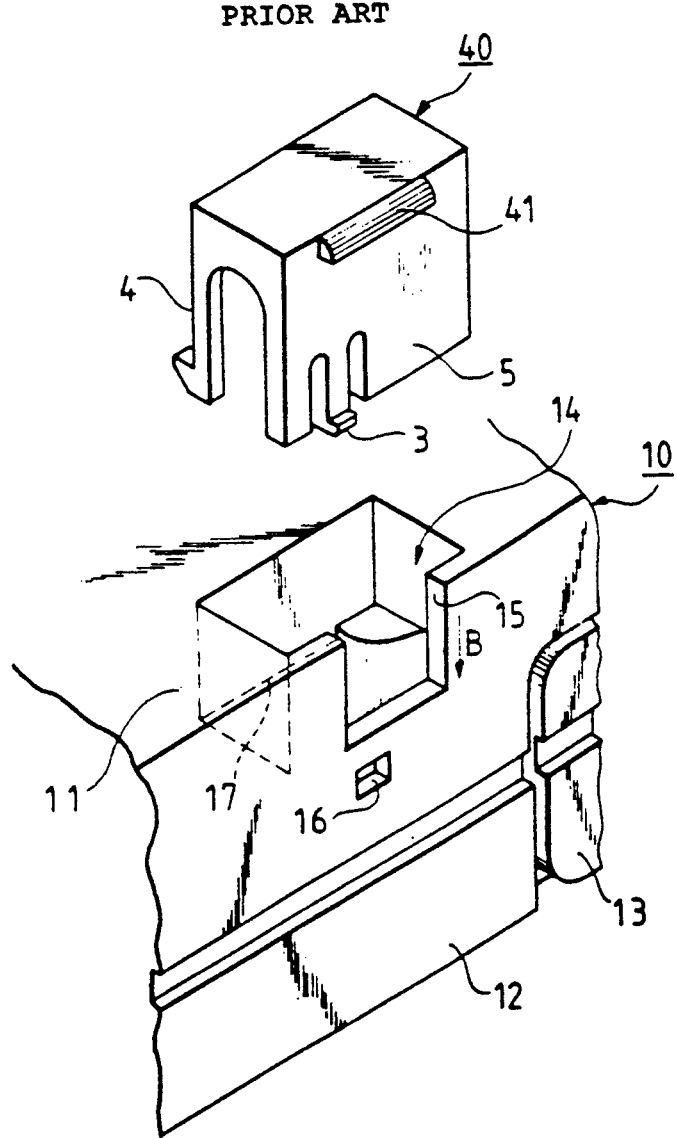

A magnetic tape cassette 10 shown in FIG. 1, which is in the case of being used as a β cam cassette, includes an openable lid 13 at a front side of the cassette. Formed in a bottom face 11 of the cassette is an insertion hole 14 having a notch 15 in a side face 12. If this cassette 10 is used as a β cam SP cassette, a movable plug 40 is mounted in the insertion hole 14 in order to prevent a mistake erasure as shown in FIG. 5. However, according to this embodiment shown in Fig. 1, a flattened immovable plug 1 is mounted in the insertion hole 14 just for covering the hole 14. On the other hand, although not shown in the drawings, a mistake erasure prevention tab of quite the same construction as that of the tab 30 acting as a mistake erasure preventing device shown in FIG. 4 is provided at an opposite position with respect to left-and-right direction to the insertion hole.

The immovable plug 1, like the conventional movable plug, has a leg portion 5, retainer portions 3 and 4 resiliently engaged with an inner wall of the insertion hole 14. Further, it has an engaging convex portion 2 When the flattened immovable plug 1 is inserted into the insertion hole 14 in a direction indicated by an arrow C in FIG. 1, the retainer portion 3 and the retainer portion 4 are hookingly engaged with a retainer aperture 16 and a distal edge 17 of the inner wall, respectively, so that the flattened immovable plug 1 cannot be removed from the insertion hole 14. The engaging convex portion 2 is designed so as to be fitted in the notch 15 in such a manner as to lie flush with the side face 12 of the cassette. Therefore, the flattened immovable plug 1, once attached, cannot be manipulated at all and it fully closes the insertion hole 14. Accordingly, for example, even if a user intends to operate the flattened immovable plug 1 as a mistake erasure preventing device, the plug would not be operated. This would notify the user of an existence of the snap-off tab which positioned at the opposite side with respect to left-and-right direction of the cassette to the flattened immovable plug 1. The erroneous operation can thus be prevented.

Figure 2:
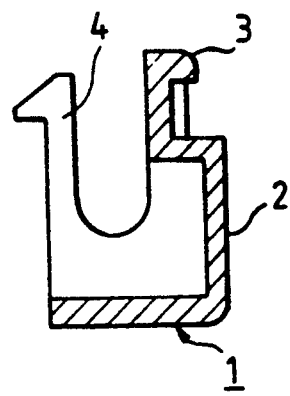
FIG. 2 is a cross-sectional view taken along a line A—A in FIG. 1.

Although the engaging convex portion 2 may merely be of a thickened construction, preferably, it has a thickness equal to the other portions in order to prevent deformation at the time of the molding, as shown in FIG. 2.

With respect to the material of the flattened immovable plug 1, it can be made of polyoxymethylene, but the material is not particularly restricted and the plug 1 may be made of other plastic resins. Although the color of the plug is not particularly limited, preferably, it should have the same color as that of the cassette casing.

If the cassette casing is made by the same mold that makes the casing shown in FIG. 1 and the casing is employed as a β cam SP cassette, the movable plug 40 shown in FIG. 5 is mounted in the insertion hole 14 in place of the flattened immovable plug 1 while snapping the tab off. Thus, a cassette casing made by a common mold can be employed both as a β cam and β cam SP cassettes.

Further, the mold which is used to mold the flattened immovable plug 1 of this embodiment can also readily produce the movable plug 40 for the β cam SP cassette merely by providing a movable insert so as to form the thumbpiece 41 of FIG. 5 at the position where the engaging convex portion 2 is formed.

Figure 3:
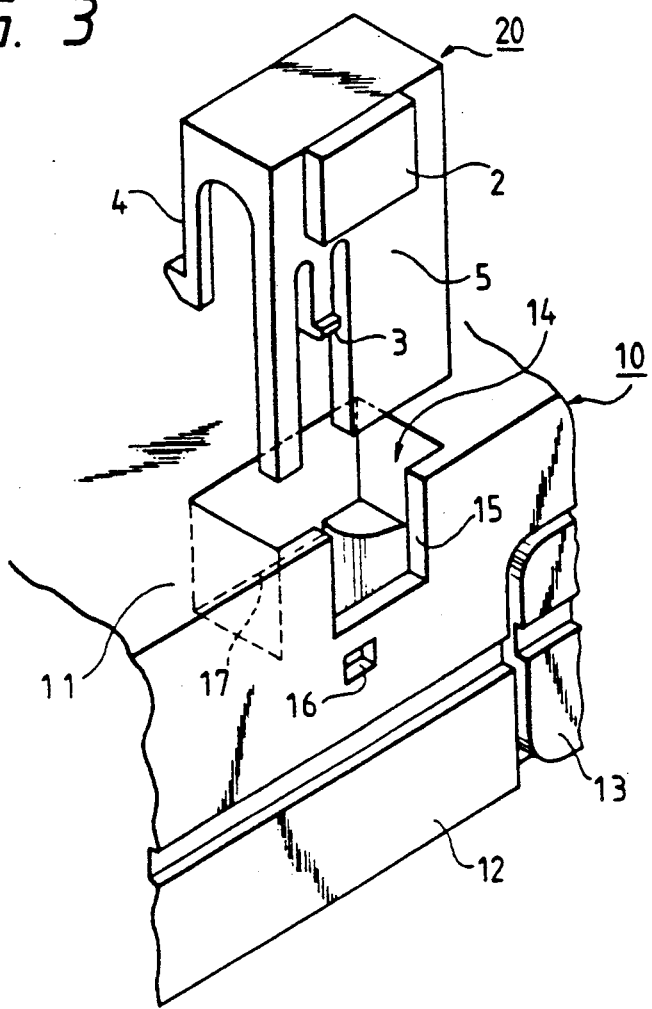
FIG. 3 is an exploded perspective view of an important portion of another preferred embodiment of the present invention.

The present invention is not to be restricted to the above embodiment, and various modifications can be made. For example, it may be constructed as shown in FIG. 3. The flattened immovable plug 20 shown in FIG. 3 is of a construction that may be referred to as "elongated leg-type". More specifically, the fixing is not made through the fitting of the engaging convex portion 2 in the notch 15 as shown in FIG. 1, but a leg portion 5 is made sufficiently long that its distal end can reach the inner surface of the opposite side of the cassette casing, thereby preventing the flattened immovable plug 20 from being manipulated in such a manner that it can be moved upward and downward The present invention is not restricted to the above-mentioned embodiments. For example, the movable plug may be rendered immovable with the use of an adhesive. In the case of use of the adhesive, however, the resulting reliability is insufficient, and if the amount of the adhesive is increased to enhance the reliability, there is a risk that the adhesive may adhere to the tape or adversely affect the travel of the tape since the plug is positioned very close to a path of travel of the tape. Therefore, so as not to rely only on the bonding force of the adhesive, it is preferred to employ a combination construction in which a suitable amount of adhesive is used to bond the retainer portion 3 and the retainer aperture 16 of FIGS. 1 and 3.

As described above, according to the present invention, the magnetic tape cassette casing for use both as a β cam and β cam SP cassettes is molded by a common mold. When the cassette casing is used as the β cam SP cassette, the snap-off tab is removed while the movable plug is mounted so that the movable plug can merely be operated. Therefore, no problem would be raised. Further, when the cassette casing is used as the β cam cassette, the snap-off tab is remained as it is while the flattened immovable plug is mounted so that there would raise no improper manipulation of the mistake erasure preventing operation.

Further, in comparison with a cassette which is used with the movable plug removed, the present cassette of the present invention is has a much improved dustproofing characteristic.

What is claimed is:

1. A magnetic tape cassette, comprising:
   a cassette casing in which a pair of tape reels on which a magnetic tape is wound are rotatably housed, an insertion hole being formed on an end face of said cassette casing, said hole being disposed near one end of an openable lid of said casing;
   a snap-off tab positioned in said end face near an opposite end of said openable lid, said tab in-turn covers a cavity which can accept an erasure prevention detecting member therein; and
   an immovable plug for inserting into and which becomes immovable when fitted in said insertion hole for covering said insertion hole, wherein said insertion hole can accommodate said immovable plug or movable erasure prevention plug.

2. The magnetic tape cassette of claim 1, wherein said immovable plug is secured in said insertion hole by an adhesive.

3. The magnetic tape cassette of claim 1, wherein said cassette casing has a notch formed in a side of said insertion hole, and wherein said immovable plug has an engaging convex portion which fills said notch to prevent said immovable plug from moving.

4. The magnetic tape cassette of claim 2, wherein said immovable plug is secured in said insertion hole by an adhesive in areas between said engaging convex portion and said notch.

5. The magnetic tape cassette of claim 2, wherein said immovable plug further has first and second hook-like retainer portions engaging, respectively, a retainer aperture below said notch and a rear wall of said insertion hole.

* * * * *